US007046676B2

(12) United States Patent
Goetzinger et al.

(10) Patent No.: US 7,046,676 B2
(45) Date of Patent: May 16, 2006

(54) QOS SCHEDULER AND METHOD FOR IMPLEMENTING QUALITY OF SERVICE WITH CACHED STATUS ARRAY

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 932 days.

(21) Appl. No.: 10/004,440

(22) Filed: Nov. 1, 2001

(65) Prior Publication Data

US 2003/0081544 A1    May 1, 2003

(51) Int. Cl.
*H04L 12/56* (2006.01)

(52) U.S. Cl. .................. 370/395.4; 370/462; 709/225; 709/234

(58) Field of Classification Search ................ 370/229, 370/230, 232, 235, 252, 253, 395.4, 395.41, 370/395.42, 395.43, 462; 709/225, 232, 709/234
See application file for complete search history.

(56) References Cited

U.S. PATENT DOCUMENTS

| | | | |
|---|---|---|---|
| 4,621,359 A | 11/1986 | McMillen | |
| 5,249,184 A | 9/1993 | Woest et al. | |
| 5,490,141 A | 2/1996 | Lai et al. | |
| 5,548,590 A | 8/1996 | Grant et al. | |
| 5,629,928 A | 5/1997 | Calvignac et al. | |
| 5,650,993 A | 7/1997 | Lakshman et al. | |
| 5,742,772 A | 4/1998 | Sreenan | |
| 5,790,545 A * | 8/1998 | Holt et al. | 370/398 |
| 5,831,971 A | 11/1998 | Bonomi et al. | |

(Continued)

FOREIGN PATENT DOCUMENTS

EP        0859492 A2     8/1998

(Continued)

OTHER PUBLICATIONS

U.S. Appl. No. 10/102,343 filed Mar. 20, 2002, "Network Processor Having Fast Flow Queue Disable Process".

(Continued)

*Primary Examiner*—John Pezzlo
*Assistant Examiner*—Brian Roberts
(74) *Attorney, Agent, or Firm*—Joan Pennington

(57) ABSTRACT

A QoS scheduler, scheduling method, and computer program product are provided for implementing Quality-of-Service (QoS) scheduling with a cached status array. A plurality of calendars are provided for scheduling the flows. An active flow indicator is stored for each calendar entry in a calendar status array (CSA). A cache copy subset of the active flow indicators from the calendar status array (CSA) is stored in a cache. The calendar status array (CSA) is updated based upon a predefined calendar range and resolution. The cache copy subset of the active flow indicators from the calendar status array (CSA) is used to determine a given calendar for servicing. The subset of the active flow indicators from the calendar status array (CSA) is used to increment a current pointer (CP) by an identified number of positions up to a current time (CT) value, where the identified number of positions is equal to a variable number of inactive flow indicators up to the current time (CT) value and the identified number of positions has a maximum value equal to a number of entries in the cache.

20 Claims, 8 Drawing Sheets

U.S. PATENT DOCUMENTS

| | | | |
|---|---|---|---|
| 5,844,890 A | 12/1998 | Delp et al. | |
| 5,850,399 A | 12/1998 | Ganmukhi et al. | |
| 5,905,730 A | 5/1999 | Yang et al. | |
| 5,926,459 A * | 7/1999 | Lyles et al. | 370/230 |
| 5,926,481 A | 7/1999 | Wang et al. | |
| 5,946,297 A * | 8/1999 | Calvignac et al. | 370/230 |
| 5,999,963 A | 12/1999 | Bruno et al. | |
| 6,014,367 A | 1/2000 | Joffe | |
| 6,018,527 A | 1/2000 | Yin et al. | |
| 6,028,842 A | 2/2000 | Chapman et al. | |
| 6,028,843 A | 2/2000 | Delp et al. | |
| 6,031,822 A | 2/2000 | Wallmeier | |
| 6,038,217 A | 3/2000 | Lyles | |
| 6,041,059 A | 3/2000 | Joffe et al. | |
| 6,064,650 A | 5/2000 | Kappler et al. | |
| 6,064,677 A | 5/2000 | Kappler et al. | |
| 6,067,301 A | 5/2000 | Aatresh | |
| 6,072,772 A | 6/2000 | Charny et al. | |
| 6,072,800 A | 6/2000 | Lee | |
| 6,078,953 A | 6/2000 | Vaid et al. | |
| 6,081,507 A | 6/2000 | Chao et al. | |
| 6,092,115 A | 7/2000 | Choudhury et al. | |
| 6,094,435 A | 7/2000 | Hoffman et al. | |
| 6,101,193 A | 8/2000 | Ohba | |
| 6,104,700 A | 8/2000 | Haddock et al. | |
| 6,108,307 A | 8/2000 | McConnell et al. | |
| 6,122,673 A | 9/2000 | Basak et al. | |
| 6,144,669 A | 11/2000 | Williams et al. | |
| 6,157,614 A | 12/2000 | Pasternak et al. | |
| 6,157,649 A | 12/2000 | Peirce et al. | |
| 6,157,654 A | 12/2000 | Davis | |
| 6,160,812 A | 12/2000 | Bauman et al. | |
| 6,169,740 B1 | 1/2001 | Morris et al. | |
| 6,188,698 B1 | 2/2001 | Galand et al. | |
| 6,226,267 B1 | 5/2001 | Spinney et al. | |
| 6,229,812 B1 | 5/2001 | Parruck et al. | |
| 6,229,813 B1 | 5/2001 | Buchko et al. | |
| 6,236,647 B1 | 5/2001 | Amalfitano | |
| 6,246,692 B1 | 6/2001 | Dai et al. | |
| 6,356,546 B1 | 3/2002 | Beshai | |
| 6,389,019 B1 | 5/2002 | Fan et al. | |
| 6,404,768 B1 | 6/2002 | Basak et al. | |
| 6,469,982 B1 * | 10/2002 | Henrion et al. | 370/230 |
| 6,563,829 B1 | 5/2003 | Lyles et al. | |
| 6,608,625 B1 | 8/2003 | Chin et al. | |
| 6,646,986 B1 * | 11/2003 | Beshai | 370/230.1 |
| 6,721,325 B1 | 4/2004 | Duckering et al. | |
| 6,804,249 B1 * | 10/2004 | Bass et al. | 370/412 |
| 6,810,012 B1 | 10/2004 | Yin et al. | |
| 6,810,043 B1 | 10/2004 | Naven et al. | |
| 6,810,426 B1 | 10/2004 | Mysore et al. | |
| 6,813,274 B1 | 11/2004 | Suzuki et al. | |
| 6,850,490 B1 | 2/2005 | Woo et al. | |
| 6,885,664 B1 | 4/2005 | Ofek et al. | |
| 6,888,830 B1 * | 5/2005 | Snyder II et al. | 370/392 |
| 6,891,835 B1 | 5/2005 | Kalkunte et al. | |
| 2002/0023168 A1 | 2/2002 | Bass et al. | |
| 2002/0181455 A1 | 12/2002 | Norman et al. | |
| 2003/0050954 A1 | 3/2003 | Tayyar et al. | |
| 2003/0058879 A1 * | 3/2003 | Rumph | 370/412 |

FOREIGN PATENT DOCUMENTS

| | | |
|---|---|---|
| EP | 0957602 A2 | 11/1999 |
| EP | 0989770 A1 | 3/2000 |
| EP | 1049352 A2 | 11/2000 |
| EP | 1061763 A2 | 12/2000 |
| JP | 2000183886 A | 6/2000 |
| JP | 2000295247 A | 10/2000 |
| JP | 2001007822 A | 12/2000 |
| WO | WO99/35792 A1 | 7/1999 |
| WO | WO99/53647 A2 | 10/1999 |
| WO | WO99/53648 A2 | 10/1999 |
| WO | WO01/20876 A1 | 3/2001 |

OTHER PUBLICATIONS

U.S. Appl. No. 10/004,373, filed Nov. 1, 2001, by William John Goetzinger, Glen Howard Handlogten, James Francis Mikos, and David Alan Norgaard entitled "QoS Scheduler and Method for Implementing Peak Service Distance Using Next Peak Service Time Violated Indication".

U.S. Appl. No. 10/002,416, filed Nov. 1, 2001, by William John Goetzinger, Glen Howard Handlogten, James Francis Mikos, and David Alan Norgaard entitled "QoS Scheduler and Method for Implementing Quality of Service with Aging Time Stamps".

U.S. Appl. No. 10/004,217, filed Nov. 1, 2001, by William John Goetzinger, Glen Howard Handlogten, James Francis Mikos, and David Alan Norgaard entitled "QoS Scheduler and Method for Implementing Quality of Service Anticipating the End of a Chain of Flows".

U.S. Appl. No. 10/016,518, filed Nov. 1, 2001, by William John Goetzinger, Glen Howard Handlogten, James Francis Mikos, and David Alan Norgaard entitled "Weighted Fair Queue Having Extended Effective Range".

U.S. Appl. No. 10/015,994, filed Nov. 1, 2001, by William John Goetzinger, Glen Howard Handlogten, James Francis Mikos, and David Alan Norgaard entitled "Weighted Fair Queue Serving Plural Output Ports".

U.S. Appl. No. 10/015,760, filed Nov. 1, 2001, by William John Goetzinger, Glen Howard Handlogten, James Francis Mikos, and David Alan Norgaard entitled "Weighted Fair Queue Having Adjustable Scaling Factor".

U.S. Appl. No. 10/002,085, filed Nov. 1, 2001, by William John Goetzinger, Glen Howard Handlogten, James Francis Mikos, and David Alan Norgaard entitled "Empty Indicators for Weighted Fair Queues".

U.S. Appl. No. 10/102,166, filed Mar. 20, 2002, "Method and Apparatus for Improving the Fairness of New Attaches to a Weighted Fair Queue in a Quality of Service (QoS) Scheduler".

Abstract of Publication entitled "Design of Packet-fair queuing schedulers using a RAM-based searching engine"by HJ Chao et al, IEEE Journal on Selected Areas in Communications, vol. 17, No. 6, pp. 1105-1126, Jun. 1999.

* cited by examiner

EXEMPLARY CALENDAR STATUS ARRAY 300
ACCESSINPS ALPSORITHM 510

CSA_Calendar_Update <=

LLSEpoch0  when CSA_Access_Counter (1 Downto 0) = 00          Else
NLSEpoch0  when CSA_Access_Counter (1 Downto 0) = 01          Else
PSEpoch0   when CSA_Access_Counter (1 Downto 0) = 10          Else
LLSEpoch1  when CSA_Access_Counter (3 Downto 0) = 0011        Else
NLSEpoch1  when CSA_Access_Counter (3 Downto 0) = 0111        Else
PSEpoch1   when CSA_Access_Counter (3 Downto 0) = 1011        Else
LLSEpoch2  when CSA_Access_Counter (5 Downto 0) = 001111      Else
NLSEpoch2  when CSA_Access_Counter (5 Downto 0) = 011111      Else
PSEpoch2   when CSA_Access_Counter (5 Downto 0) = 101111      Else
LLSEpoch3  when CSA_Access_Counter (7 Downto 0) = 00111111    Else
NLSEpoch3  when CSA-Access_Counter  (7 Downto 0) = 01111111   Else
PSEpoch3   when CSA_Access_Counter (7 Downto 0) = 10111111    Else
LLSEpoch4  when CSA_Access_Counter (9 Downto 0) = 0011111111  Else
NLSEpoch4  when CSA_Access_Counter (9 Downto 0) = 0111111111  Else
PSEpoch4   when CSA_Access_Counter (9 Downto 0) = 1011111111  Else
None

FIG . 5B

QOS SCHEDULER AND METHOD FOR IMPLEMENTING QUALITY OF SERVICE WITH CACHED STATUS ARRAY

FIELD OF THE INVENTION

The present invention relates generally to the storage and data networking fields, and more particularly, relates to a scheduler, scheduling method, and computer program product for implementing Quality-of-Service (QoS) scheduling with a cached status array.

RELATED APPLICATIONS

Related United States patent applications by William John Goetzinger, Glen Howard Handlogten, James Francis Mikos, and David Alan Norgaard and assigned to the present assignee are being filed on the same day as the present patent application including:

U.S. patent application Ser. No. 10/004373, entitled "QoS SCHEDULER AND METHOD FOR IMPLEMENTING PEAK SERVICE DISTANCE USING NEXT PEAK SERVICE TIME VIOLATED INDICATION";

U.S. patent application Ser. No. 10/002416, entitled "QoS SCHEDULER AND METHOD FOR IMPLEMENTING QUALITY OF SERVICE WITH AGING TIME STAMPS";

U.S. patent application Ser. No. 10/004217, entitled "QoS SCHEDULER AND METHOD FOR IMPLEMENTING QUALITY OF SERVICE ANTICIPATING THE END OF A CHAIN OF FLOWS";

U.S. patent application Ser. No. 10/016518, entitled "WEIGHTED FAIR QUEUE HAVING EXTENDED EFFECTIVE RANGE";

U.S. patent application Ser. No. 10/015994, entitled "WEIGHTED FAIR QUEUE SERVING PLURAL OUTPUT PORTS";

U.S. patent application Ser. No. 10/015760, entitled "WEIGHTED FAIR QUEUE HAVING ADJUSTABLE SCALING FACTOR"; and U.S. patent application Ser. No. 10/002085, entitled "EMPTY INDICATORS FOR WEIGHTED FAIR QUEUES".

DESCRIPTION OF THE RELATED ART

Storage and data networks are designed to support the integration of high quality voice, video, and high speed data traffic. Storage and data networking promises to provide transparent data sharing services at high speeds. It is easy to see that rapid movement and sharing of diagrams, pictures, movies, audio, and the like requires tremendous bandwidth. Network management is concerned with the efficient management of every bit of available bandwidth.

A need exists for a high speed scheduler for networking that ensures the available bandwidth will not be wasted and that the available bandwidth will be efficiently and fairly allocated. The scheduler should permit many network traffic flows to be individually scheduled per their respective negotiated Quality-of-Service (QoS) levels. This would give system administrators the ability to efficiently tailor their gateways, switches, storage area networks (SANs), and the like. Various QoS can be set up using combinations of precise guaranteed bandwidth, required by video for example, and limited or unlimited best effort bandwidth for still pictures, diagrams, and the like. Selecting a small amount of guaranteed bandwidth with the addition of some bandwidth from the pool of best effort bandwidth should guarantee that even during the highest peak periods, critical data will be delivered to its application at that guaranteed rate.

A scheduler advantageously may be added to a network processor to enhance the quality of service (QoS) provided by the network processor subsystem.

Known high-performance network processor scheduler systems are able to search entire calendars in one system cycle for the purpose of updating calendar status, that is active flow status. High-performance schedulers will no longer be able to search entire calendar arrays within one system cycle as performance requirements increase. Bandwidth constraints no longer allow the entire calendar array to be searched each cycle. A new technique is needed to perform calendar updates.

SUMMARY OF THE INVENTION

A principal object of the present invention is to provide a QoS scheduler, scheduling method, and computer program product for implementing Quality-of-Service (QoS) scheduling with a cached status array. Other important objects of the present invention are to provide such QoS scheduler, scheduling method, and computer program product for implementing Quality-of-Service (QoS) scheduling with a cached status array substantially without negative effect and that overcome some disadvantages of prior art arrangements.

In brief, a QoS scheduler, scheduling method, and computer program product are provided for implementing Quality-of-Service (QoS) scheduling with a cached status array. A plurality of calendars are provided for scheduling the flows. An active flow indicator is stored for each calendar entry in a calendar status array (CSA). A subset of the active flow indicators from the calendar status array (CSA) is stored in a cache. The calendar status array (CSA) is updated based upon a predefined calendar range and resolution. The subset of the active flow indicators from the calendar status array (CSA) is used to determine a given calendar for servicing.

In accordance with features of the invention, the cache copy subset of the active flow indicators from the calendar status array (CSA) is used to increment a current pointer (CP) by an identified number of positions up to a current time (CT) value, where the identified number of positions is equal to a variable number of inactive flow indicators up to the current time (CT) value and the identified number of positions has a maximum value equal to a number of entries in the cache.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
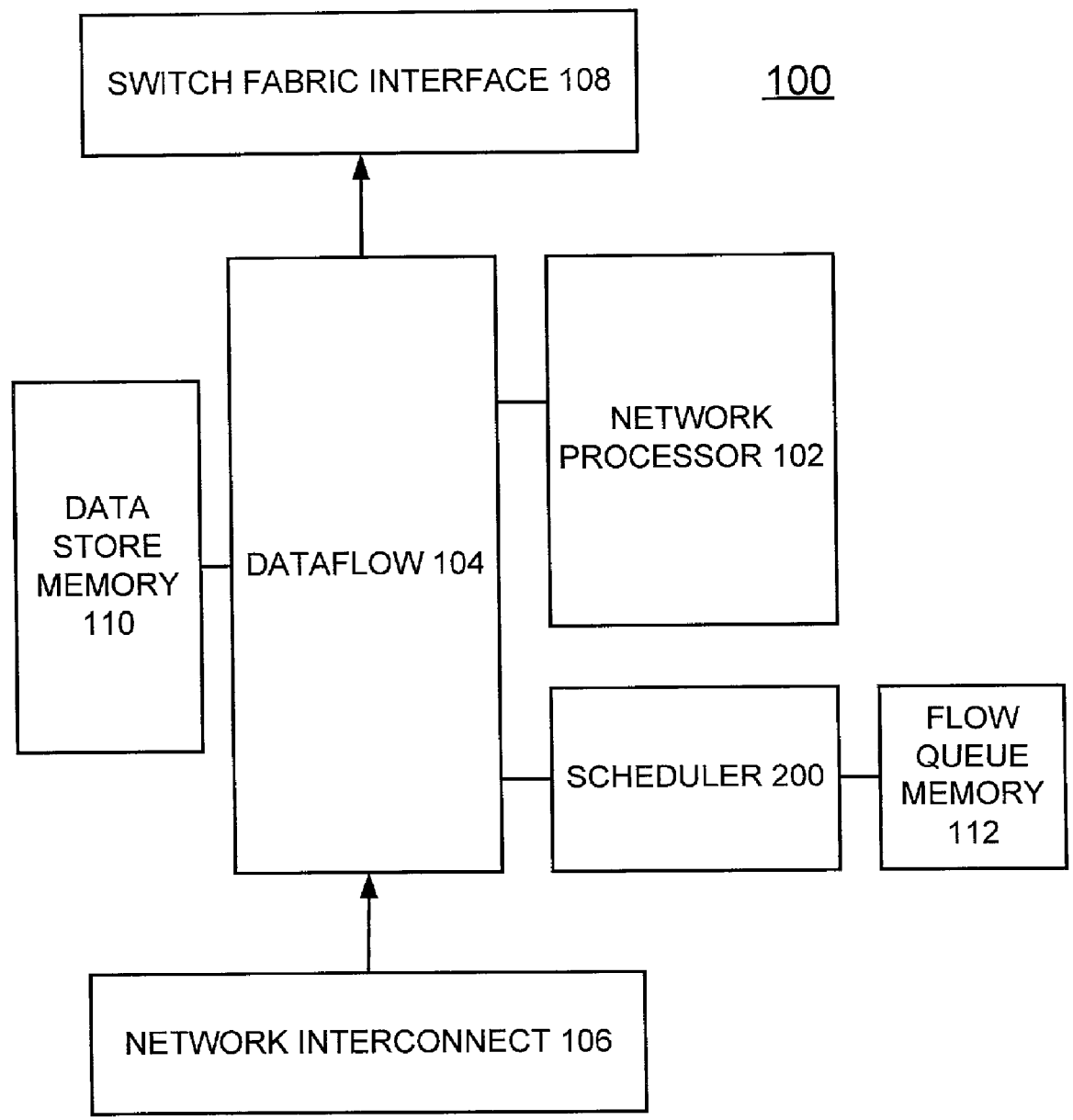
FIG. 1A is a block diagram illustrating a network processor system including a scheduler for carrying out scheduling methods for implementing Quality-of-Service (QoS) scheduling with a cached status array of the preferred embodiment.

Having reference now to the drawings, in FIG. 1A, there is shown a network processor system generally designated by the reference character 100 including a scheduler 200 for carrying out scheduling methods for implementing Quality-of-Service (QoS) scheduling with a cached status array of the preferred embodiment. As shown in FIG. 1A, network processor system 100 includes a network processor 102 that executes software responsible for forwarding network traffic. Network processor 102 includes hardware assist functions for performing operations, such as table searches, policing, and statistics tracking. A dataflow 104 serves as the primary data path for transmitting and receiving data flow traffic, for example, via a network interconnect 106 and/or a switch fabric interface 108. Dataflow 104 provides an interface to a large data store memory 110 for buffering of traffic bursts when an incoming frame rate exceeds an outgoing frame rate. An external flow queue memory 112 is coupled to scheduler 200. As performance of network processor 102 continues to increase, unique techniques and design solutions enable the QoS scheduler 200 to perform reliably at these high data rates.

Scheduler 200 of the preferred embodiment permits many network traffic flows, for example, 64 thousand (64K) network traffic flows to be individually scheduled per their respective assigned Quality-of-Service (QoS) level. Each flow is basically a one-way connection between two different points. QoS parameters are held in a flow queue control block (FQCB), such as in the external flow queue memory 112. QoS parameters include sustained service distance (SSD), peak service distance (PSD), queue distance (QD), port identification (ID), and the like. There can be, for example, 64 thousand flows and a FQCB for each flow.

Figure 1B:
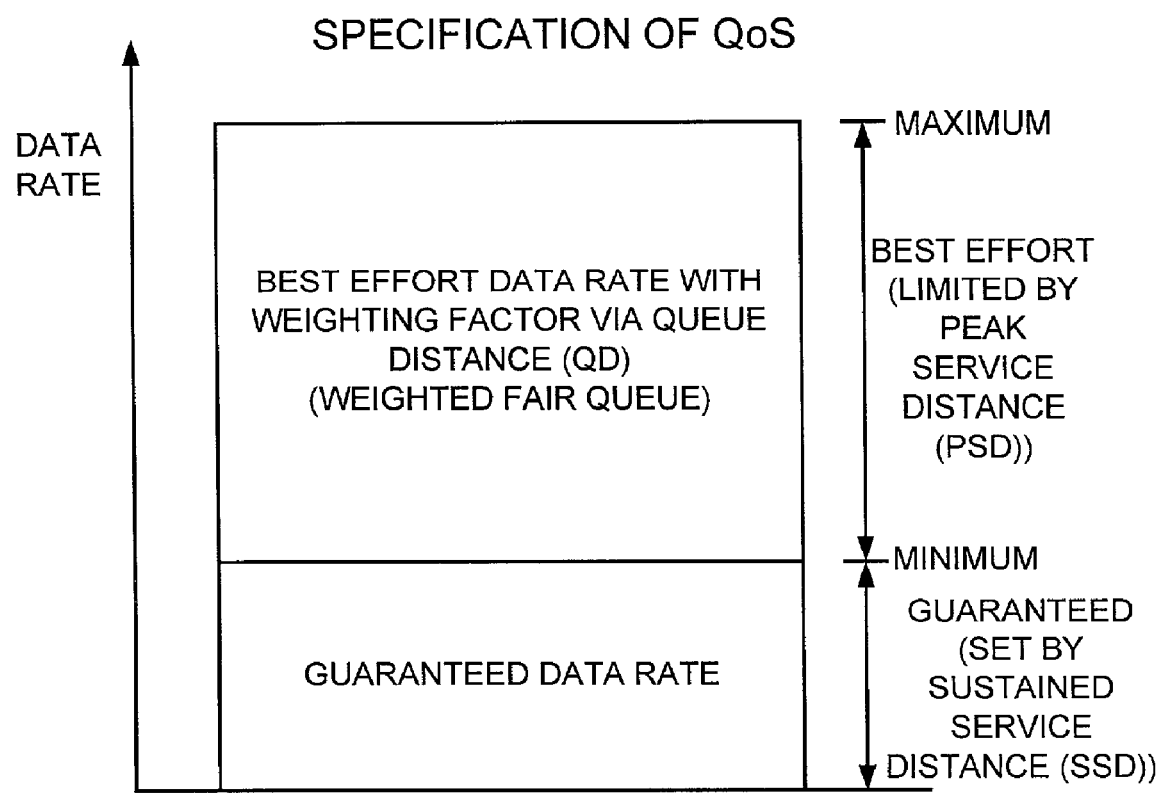
FIG. 1B is diagram providing a graphical illustration of various types of QoS algorithms in accordance with the preferred embodiment.

FIG. 1B provides a graphical illustration of various types of QoS algorithms. The scheduler 200 provides for quality of service by maintaining flow queues that may be scheduled using various algorithms, such as a set guaranteed bandwidth, or best effort or weighted fair queue (WFQ) with or without a peak bandwidth service (PBS) limit. The best effort or weighted fair queue is limited via the peak service distance (PSD) QoS parameter. The guaranteed bandwidth is set via the sustained service distance (SSD) QoS parameter. A combination of these algorithms provide efficient utilization of available bandwidth. The scheduler 200 supplements the congestion control algorithms of dataflow 104 by permitting frames to be discarded based on per flow queue thresholds.

Figure 2:
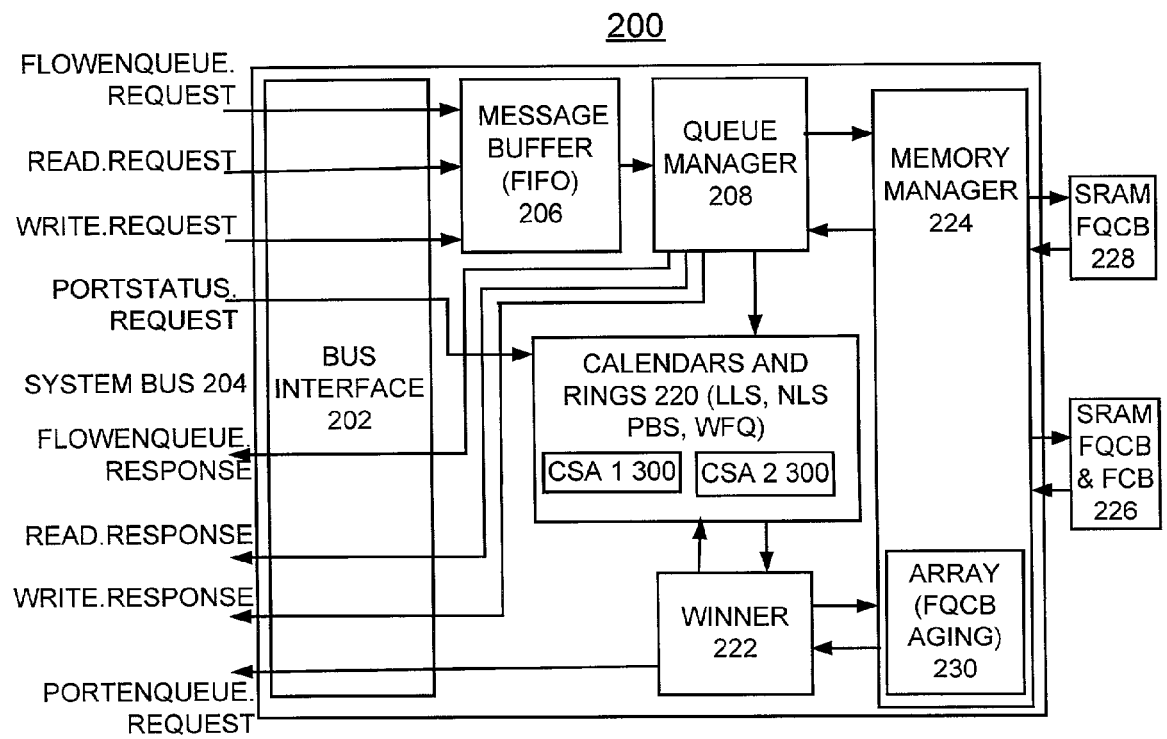
FIG. 2 is a high-level system diagram illustrating the scheduler for carrying out scheduling methods for implementing QoS scheduling with a cached status array of the preferred embodiment.

Referring now to FIG. 2, there is shown a high-level system diagram illustrating the scheduler 200 for carrying out scheduling methods of the preferred embodiment. Scheduler 200 includes a bus interface 202 coupled to a system bus 204 interconnecting modules in the system 100. Chipset messages are exchanged between modules using system bus 204. Messages include flow enqueue requests which add frames to a given flow and read and write requests. Scheduler 200 includes a message buffer 206, such as a first-in first-out (FIFO) message buffer, that stores messages until they are ready to be executed. Scheduler 200 includes a queue manager 208 coupled to the message buffer 206. Queue manager 208 processes the incoming messages to determine what action is required. Queue manager 208 is coupled to calendars and rings block 220 and a memory manager 224. A winner partition 222 arbitrates between the calendars and rings 220 to choose which flow will be serviced next. The memory manager 224 coordinates data reads from and writes to a first and second external static random access memory (SRAM) 226 and 228 and an internal memory array 230.

For a flow enqueue request received by queue manager 208, the flow's FQCB information is retrieved from one of the external SRAM 226 or 228 or internal array 230 and examined to determine if the new frame should be added to an existing frame string for a given flow, start a new frame string, or be discarded. In addition, the flow queue may be attached to a calendar or ring for servicing in the future. Read and write request messages received by queue manager 208 are used to initialize flows.

Port back-pressure from the dataflow 104 to the scheduler 200 occurs via the port status request message originated from the dataflow and applied to the calendar and rings block 220. When a port threshold is exceeded, all WFQ and PBS traffic associated with that port is held in the scheduler 200 and the selection logic of winner partition 222 does not consider those flows potential winners. When port back-pressure is removed, the flows associated with that port are again eligible to be winners.

Calendars and rings block 220 includes, for example, three calendars (low latency service (LLS), normal latency service (NLS), peak bandwidth service (PBS)) and weighted fair queues (WFQs). The calendars are time based. The weighted fair queues (WFQs) are weight based. The WFQs are also referred to as best effort queues because WFQs can only schedule excess bandwidth and therefore can have no bandwidth guarantee associated with them.

Flows are attached to one or more of three calendars (LLS, NLS, PBS) and one WFQ ring 220 in a manner consistent with its QoS parameters. For example, if a flow has a guaranteed bandwidth component, it is attached to a time based calendar. If a flow has a WFQ component, it is attached to the WFQ ring. A flow may have both a guaranteed and best effort or WFQ component. The calendars 220 are used to provide guaranteed bandwidth with both a low latency service (LLS) and a normal latency service (NLS) packet rate. Flows are scheduled for service at a certain time in the future. WFQ rings are used by the weighted fair queuing algorithm. Entries are chosen based upon position in the WFQ rings 220 without regard to time. The WFQ rings 220 are work conserving or idle only when there are no flows to be serviced. A flow set up using a WFQ ring can optionally have a peak bandwidth limit associated with it.

Scheduler 200 performs high speed scheduling, for example, processing 27 Million frames per second (Mframes/second). Scheduling rates per flow for the LLS, NLS and PBS calendars 220 range, for example, from 10 Giga bits per second (Gbps) to 3.397 Thousand bits per second (Kbps). Rates do not apply to the WFQ ring.

SRAM 226 is an external high speed, for example, quad data rate (QDR) SRAM containing flow queue information or flow queue control block (FQCB) information and frame information or frame control block (FCB) information. SRAM 228 is, for example, an optional external QDR SRAM containing flow queue information or flow queue control block (FQCB) depending on the number of flows. Internal array 230 contains for example, 4k FQCB or 64K aging information. Internal array 230 may be used in place of the external SRAM 228 if less than four thousand (4K) flows are required and is also used to hold time stamp aging information. Internal array 230 containing FQCB aging information is used with logic that searches through the flows and invalidates expired time stamps.

Queue manager 208 performs the queuing operation of scheduler 200 generally as follows: A linked list or string of frames is associated with each flow. Frames are always enqueued to the tail of the linked list. Frames are always dequeued from the head of the linked list. Flows are attached to one or more of four calendars/rings (LLS, NLS, PBS, WFQ) 220 using the QoS parameters. Selection of which flow to service is done by examining the calendars/rings 220 in the order of LLS, NLS, PBS, WFQ. Then the frame at the head of the selected flow is selected for service. The flow queues are not grouped in any predetermined way to target port. The port number for each flow is user programmable. All WFQ flows with the same port ID are attached to the same WFQ ring. The QoS parameters also apply to the discard flow. The discard flow address is user selectable and is set up at configuration time.

When a flow enqueue request is sent to the scheduler 200, its frame is tested for possible discard using information from the flow enqueue request message and information stored in the FQCB. If the frame is to be discarded then the FQCB pointer is changed from the FQCB in flow enqueue request message to the discard FQCB. Alternatively, the frame is added to the tail end of the FCB chain associated with the FQCB. In addition, the flow is attached if it is not already attached to the appropriate calendar (LSS, NLS, PBS), or ring (WFQ). As time passes, selection logic of winner partition 222 determines which flow is to be serviced (first LLS, then NLS, then PBS, then WFQ). If a port bandwidth threshold has been exceeded, the WFQ and PBS component associated with that port are not eligible to be selected. When a flow is selected as the winner, the frame at the head of the FCB chain for the flow is dequeued and a port enqueue response message is issued to the dataflow 104. If the flow is eligible for a calendar reattach, the flow is reattached to the appropriate calendar (LLS, NLS, PBS) or ring (WFQ) in a manner consistent with the QoS parameters.

Scheduler 200 of the preferred embodiment keeps track of multiple calendars 220. For example, calendars 220 include 5 epochs of low latency service (LLS) calendars, 5 epochs of normal latency service (NLS) calendars, and 5 epochs of peak service (PS) calendars, each calendar epoch including 512 entries. Also, the scheduler 200 needs to be able to keep track of many rings, for example, 66 WFQ rings, with 2 parsecs with 256 entries each for a total of 41472 locations. Any of these locations could potentially need to be updated. Conventional network processor designs read all entries each system cycle then performed a search based on the results. Bandwidth constraints no longer allow the entire calendar array to be searched each cycle.

In accordance with features of the preferred embodiment, a calendar status array (CSA) 300 provides an indication that a LLS, NLS, PS calendar, or a WFQ ring has an active flow attached. In the preferred embodiment, 1 bit is used for each possible calendar or ring location. In the preferred embodiment two on-chip arrays CSA 1, CSA 2, 300 store both the calendar and ring active flow indicator. Access to the arrays CSA 1, CSA 2, 300 is shared during a scheduler interval or scheduler tick that, for example, is equal to 6 clock cycles. For example, CSA access is shared with the WFQ rings 220 getting 2 reads per tick and the calendars 220 getting 1 read. For example, the WFQ rings access 256 bits via two 128 bit wide arrays defining CSA 1, CSA 2, 300. The calendar 220 uses, for example, one of the 128 bit wide arrays defining CSA 1, 300 for each CSA access.

Figure 3:
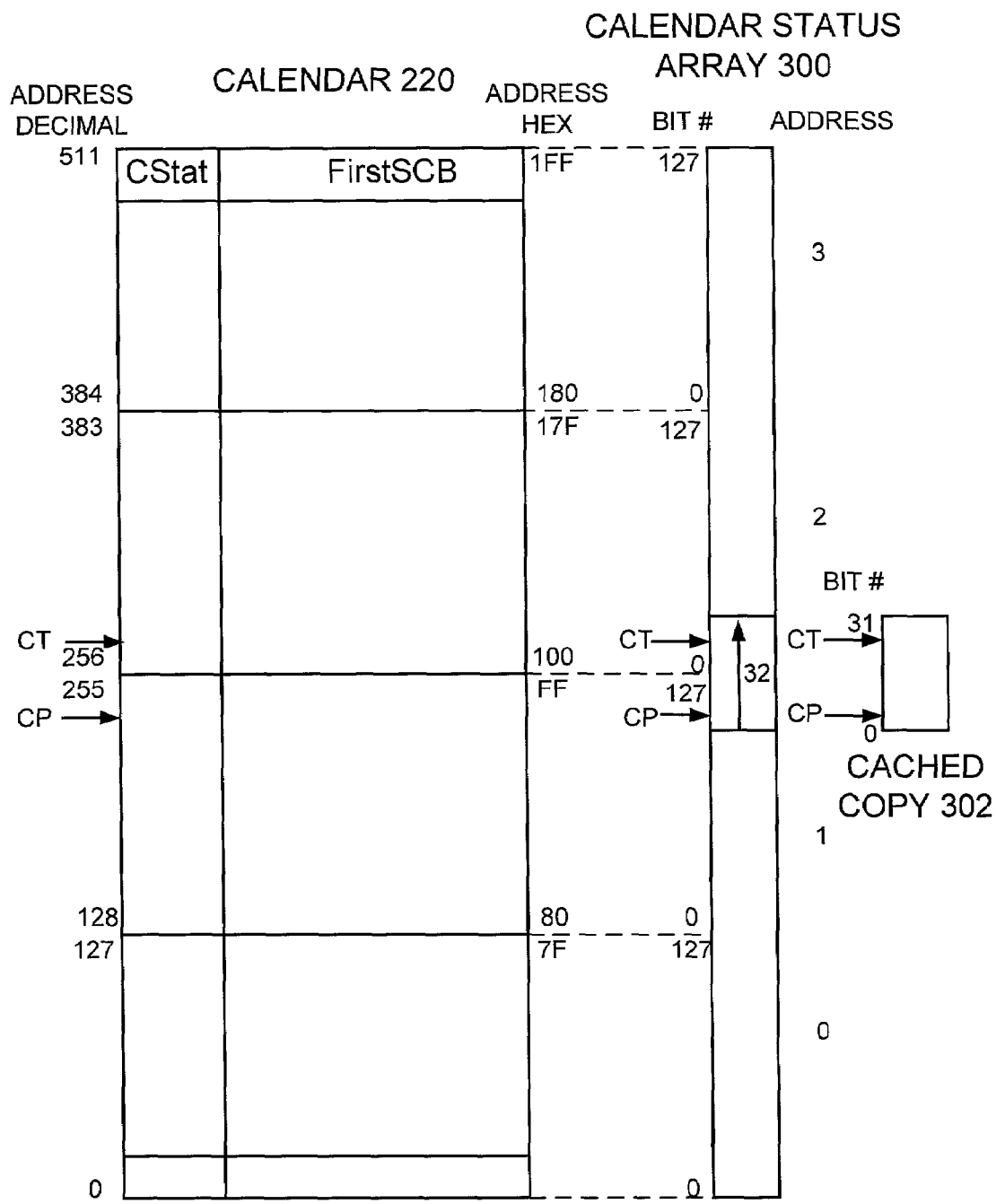
FIG. 3 is a diagram illustrating a calendar status array of the preferred embodiment.

Referring now to FIG. 3, the calendar status array, (CSA) 300 for each of the multiple calendars is illustrated. The CSA 300 stores an indicator for each calendar entry to indicate if a flow is attached. As shown, calendar includes 512 entries (0:511) and CSA 300 stores 512 respective flow status indicators (0:127) with a respective address 0–3. Each calendar entry contains status bits indicated by the label CStat including a valid bit and a flow status indicator and scheduler control block (SCB) information indicated by the label FirstSCB. Each flow status indicator stored in calendar entry CStat identifies if an active flow is attached to that respective calendar entry. This flow status indicator is updated periodically in the on-chip CSA 300.

A portion of the data of on-chip CSA 300 is accessible in one cycle, for example, for each CSA access, ¼ or 128 of the 512 flow status indicators are read. For example, in a first CSA access 128 flow status indicators corresponding to calendar entries (0:127) are read for CSA address 0. 32 of those bits are stored in a CSA cache 302 corresponding to the calendar epoch for that CSA read. When the cache overlaps two contiguous CSA addresses, for example, 0 and 1, CSA address 1 will be read. The cache 302 will be refreshed with the new information for the bits corresponding to CSA address 1. The bits corresponding to CSA 0 will be shifted from the high order bits in the cache 302 to the appropriate low order bits. The main reason for using the cached CSA bits is to allow simultaneous access to all calendar epochs without having to read all calendar epochs' worth of status information each time.

A subset of the data of on-chip array CSA1, 300 is cached for each of the calendars 220 in a cache 302 labeled CACHED COPY 302 in FIG. 3. The preferred embodiment cache 302 stores 32 bits of flow status indicators from the on-chip CSA 1, 300 for each of the calendars 220. For example, 15 caches 302 store 32 bits for each of the 3 calendars 220 with 5 epochs each, including 5 epochs of the low latency service (LLS) calendar, 5 epochs of the normal latency service (NLS) calendar, and 5 epochs of the peak service (PS) calendar.

The cache copy data contained in the cache 302 is used to determine if a given calendar is ready to dequeue a frame. A current pointer (CP) stored in an on-chip register points to a calendar entry that may be picked for servicing when current time (CT) stored in another on-chip register is greater than or equal to the CP. The current pointer (CP) determines where CSA 300 is accessed, with one of four addressed portions of CSA 300 accessible in one cycle. The cache 302 stores 32 bits of flow status indicators from the on-chip CSA 1, 300 based upon the current pointer (CP). For example, with current pointer (CP) equal to 24, flow status indicator bits 24–55 from the on-chip CSA 1, 300 are loaded into the cached copy data of cache 302.

The cached copy data in cache 302 is used with the CSA 300 to accommodate a wrap condition where the current pointer (CP) spans two different CSA addresses. For example, for CP at a calendar entry with an active flow, for example, calendar entry 120, the 32 bits of cached copy data in cache 302 includes 8 active flow indicator bits corresponding to calendar entries (120:127) from the previous cache copy access of CSA 300 that are shifted to a low portion of cache 302 and 24 active flow indicator bits corresponding to calendar entries (128:151) in a top portion of cache 302 from one read of CSA 300.

The cached copy data in cache 302 is also used to allow the current pointer (CP) to catch-up to current time (CT).

Figure 4:
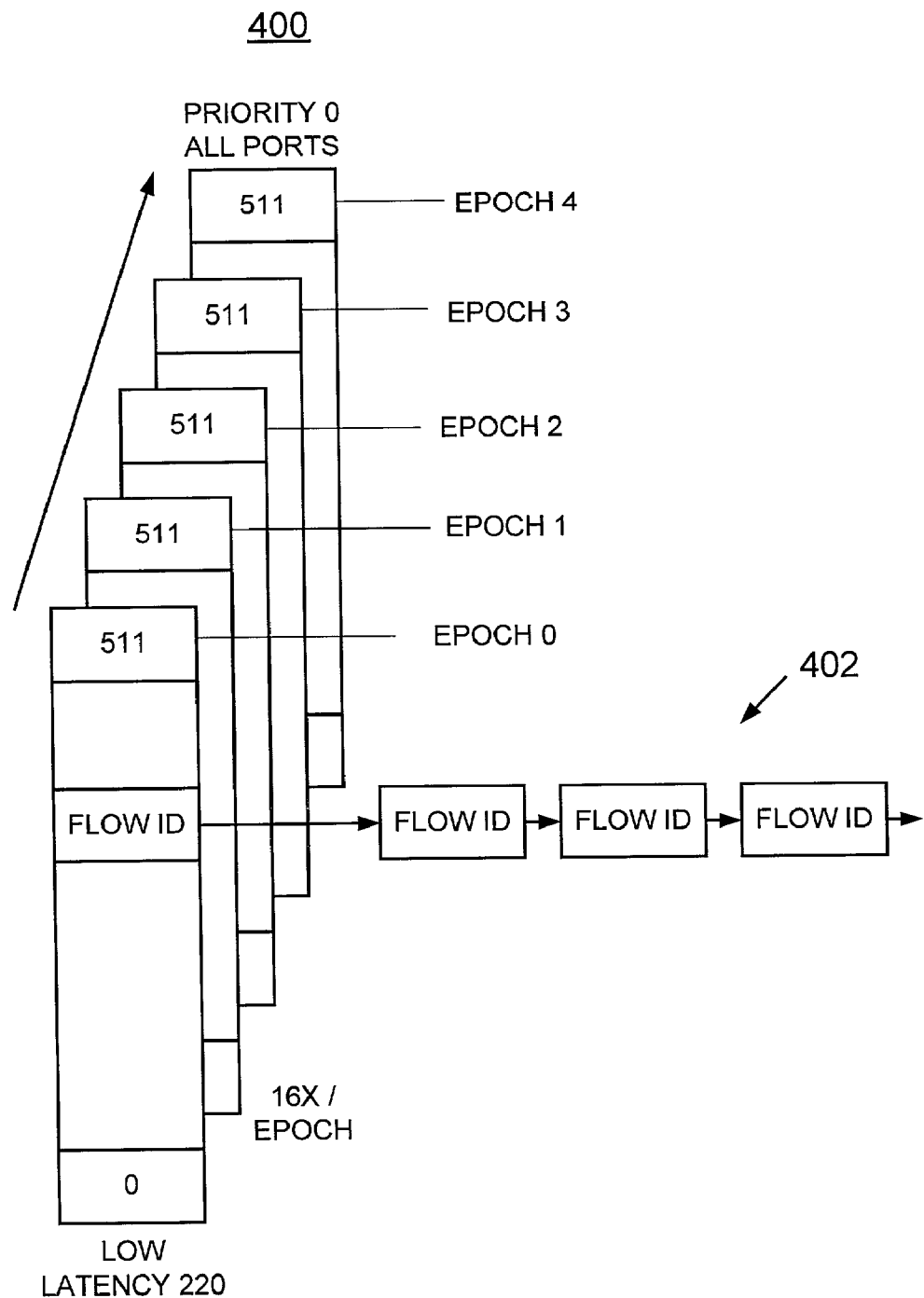
FIGS. 4 and 5 are diagrams illustrating a calendar array including multiple epochs of the preferred embodiment.

The CP can regularly fall behind CT. For example, when servicing a calendar entry that contains several chained flows, the CT increments once each time a flow is serviced. The CP does not increment until all flows are serviced in a chain 402 of multiple flows for FLOW ID as shown in FIG. 4, where the CP is stored in the FLOW ID flow queue control block (FQCB). Without the ability to increment CP at a rate faster than CT is incremented, CP will fall extremely far behind CT causing system problems.

In accordance with features of the preferred embodiment, CP is allowed to be incremented more than 1 position per tick by utilizing the 32 bit entry cache 302. CP is allowed to be incremented by an identified number of calendar entries having no active flows attached up to the CT. To illustrate this, an Example 1 is shown where examining the 32 bit cache 302, a window within the cache reveals the relationship between CP and CT as follows:

| Example 1 of Cache window | | |
|---|---|---|
| entry 317 | 1 | |
| entry 316 | 0 | ← CT |
| entry 315 | 0 | |
| entry 314 | 0 | |
| entry 313 | 0 | |
| entry 312 | 1 | ← CP |

In Example 1, CP is currently pointing to a calendar entry with an active flow, for example, entry 312 as shown. Once this flow is serviced, CP may be incremented by 4 since the indicator bits between CT and CP+4 are 0. This indicates that no active flows are attached to the next 4 calendar entries. By incrementing CP by 4, for example, to calendar entry 316, CP will once again=CT. CP is never incremented past CT. This technique allows CP to be incremented by at most 32 positions each tick, that is, the number of entries in the cache 302.

In accordance with features of the preferred embodiment, calendars 220 are segmented into epochs. Epoch is a term used to identify a technique that increases the effective range of a calendar 220 without increasing the physical size of the on-chip array CSA 300 by segmenting the calendar into sections or epochs. Epoch 0 has the highest resolution and lowest range. Epochs 1 through p will have a range of n(p) times the range of the first epoch and a resolution of $1/n^{**}p$ of the first epoch, where n equals a set scaling factor. As the epoch number increases, calendar range is extended and resolution is reduced.

Referring now to FIG. 4, the low latency calendar 220 is shown including multiple epochs generally designated by reference numeral 400. Epoch 0, 400 has the highest resolution and the lowest range. Epoch 1 through Epoch 4 have a range from 16 to 16**4 or 65,536 times the range of the first Epoch 0. The resolution of Epoch 1 through Epoch 4 is represented by $1/16^{Epoch}$; that is Epoch 1 has a resolution of $1/16$ of Epoch 0 and Epoch 4 has a resolution of $1/16^4$ of Epoch 0.

Figure 5A:
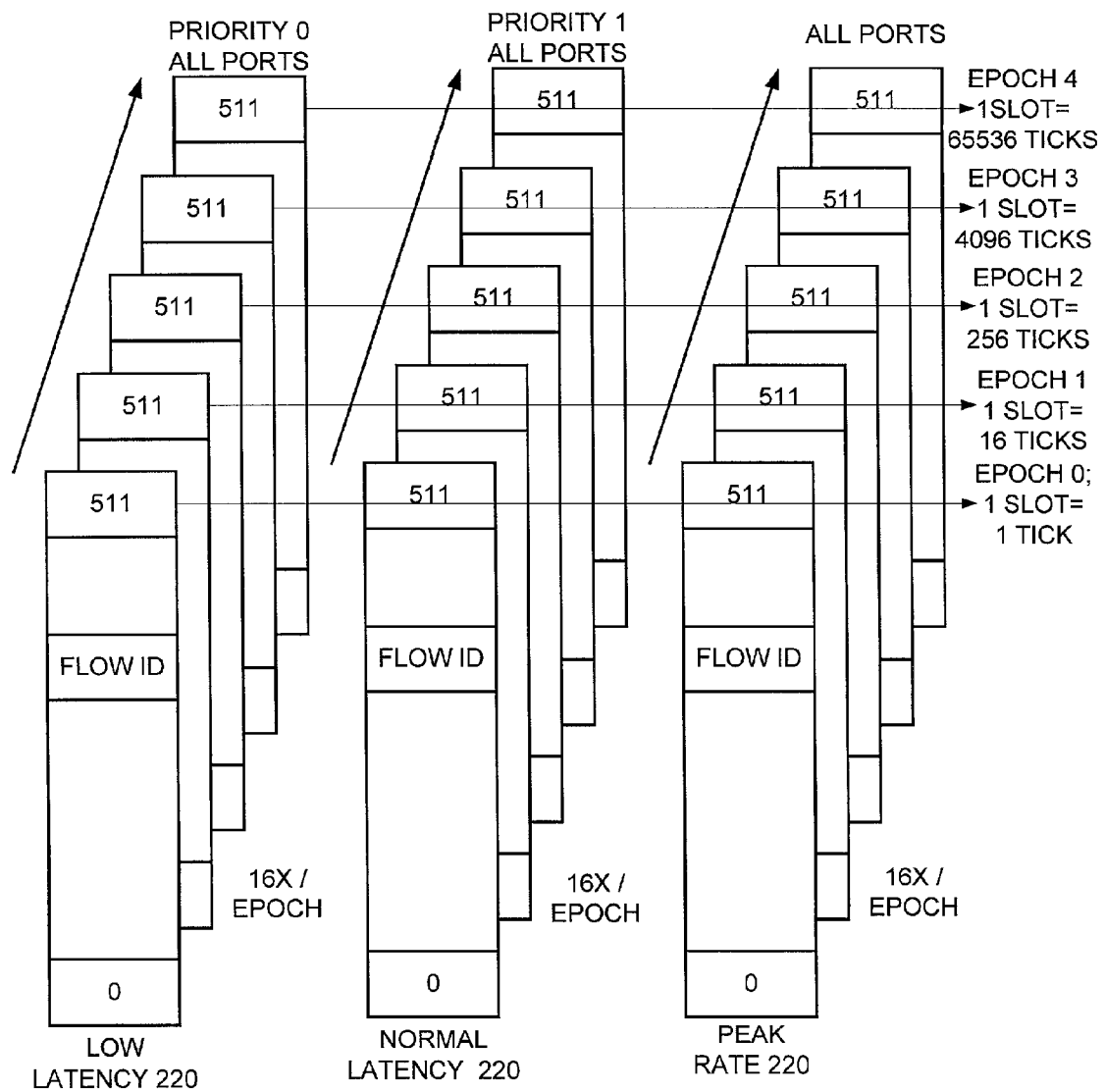

FIG. 5A illustrates the preferred embodiment of calendar epochs generally designated by reference numeral 500 including epochs 0–p, where p=4. Based on this embodiment, since the lower calendar epochs will go through their cached data more quickly, the lower calendar epochs access the CSA 300 more frequently than the higher epochs, for example as follows:

Epoch 0s are accessed every 4 ticks
Epoch 1s are accessed every 16 ticks
Epoch 2s are accessed every 64 ticks
Epoch 3s are accessed every 256 ticks
Epoch 4s are accessed every 1024 ticks Referring now to FIG. 5B, the number of ticks between epoch accesses is determined based upon the scaling factor of the epoch and number of calendars used. The example above is for a case of 3 calendars (LLS, NLS and PS). Each of the calendars has 5 epochs with a scaling factor of 16, as illustrated in FIG. 5A. An exemplary algorithm 510 for accessing the CSA 300 for updating the cache copy data of cache 302 is:

CSA_Calendar_Update<=
LLSEpoch0 when CSA_Access_Counter (1 Downto 0)=00 Else
NLSEpoch0 when CSA_Access_Counter (1 Downto 0)=01 Else
PSEpoch0 when CSA_Access_Counter (1 Downto 0)=10 Else
LLSEpoch1 when CSA_Access_Counter (3 Downto 0 )=0011 Else
NLSEpoch1 when CSA_Access_Counter (3 Downto 0 )=0111 Else
PSEpoch1 when CSA_Access_Counter (3 Downto 0 )=1011 Else
LLSEpoch2 when CSA_Access_Counter (5 Downto 0 )=001111 Else
NLSEpoch2 when CSA_Access_Counter (5 Downto 0 )=011111 Else
PSEpoch2 when CSA_Access_Counter (5 Downto 0 )=101111 Else
LLSEpoch3 when CSA_Access_Counter (7 Downto 0 )=00111111 Else
NLSEpoch3 when CSA_Access_Counter (7 Downto 0 )=01111111 Else
PSEpoch3 when CSA_Access_Counter (7 Downto 0 )=10111111 Else
LLSEpoch4 when CSA_Access_Counter (9 Downto 0 )=0011111111 Else
NLSEpoch4 when CSA_Access_Counter (9 Downto 0 )=0111111111 Else
PSEpoch4 when CSA_Access_Counter (9 Downto 0 )=1011111111 Else
None In addition to the regularly scheduled read of the CSA 300 for a given calendar cache 302, the cache 302 can be updated by snooping the CSA location for an enqueue or reattach event. This gets the data to the cache 302 in the event that the normally scheduled update would not get the data to the cache in time. Also if the same flow is picked twice in a row as a winner from the same calendar or ring, the CSA 300 will not be updated as there is not enough time to add and remove the bit from the CSA. Special hardware is used in this case to properly schedule the flow.

Figure 6:
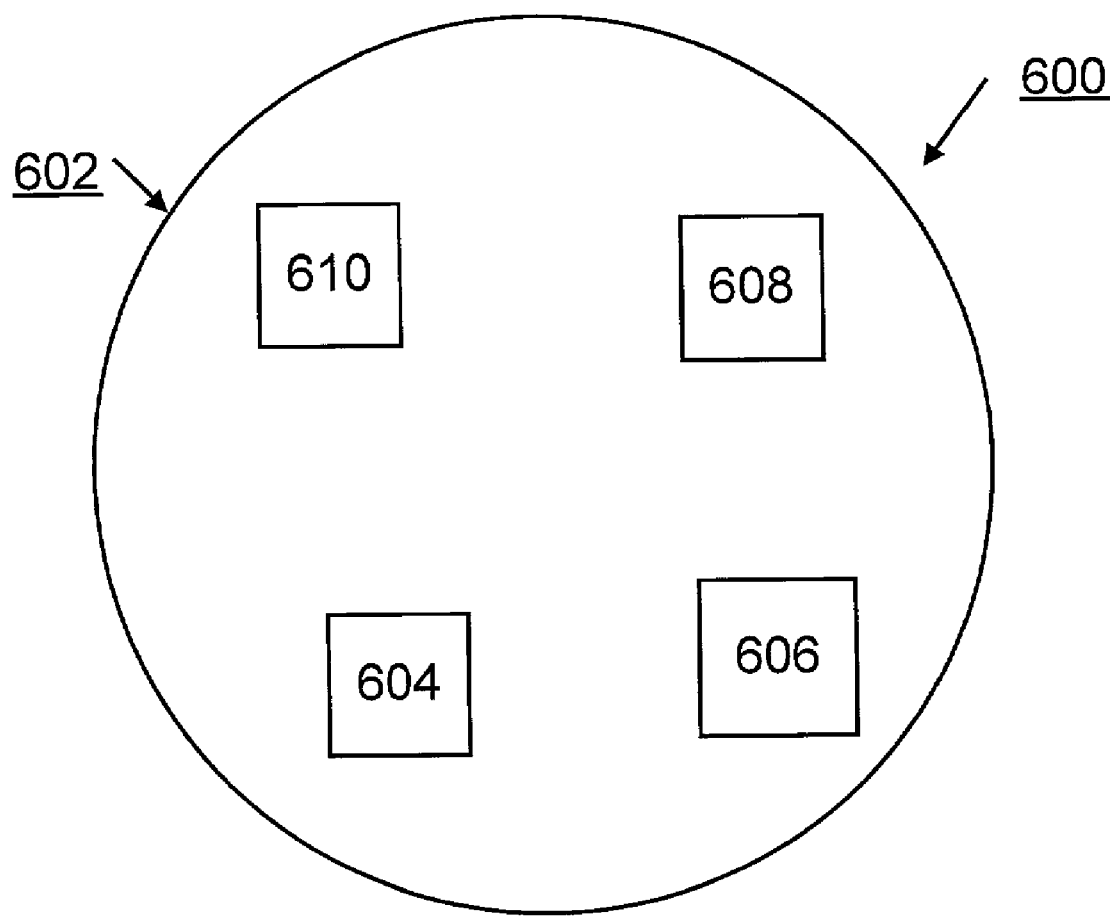
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out scheduling methods for implementing Quality-of-Service (QoS) scheduling with a cached status array of the preferred embodiment in the system 100 of FIG. 1.

A sequence of program instructions or a logical assembly of one or more interrelated modules defined by the recorded program means 604, 606, 608, 610, direct the computer system 100 for implementing Quality-of-Service (QoS) scheduling with a cached status array of the preferred embodiment.

While the present invention has been described with reference to the details of the embodiments of the invention shown in the drawing, these details are not intended to limit the scope of the invention as claimed in the appended claims.

What is claimed is:

1. A scheduling method for implementing Quality-of-Service (QoS) scheduling for a plurality of flows with a cached status array and a plurality of calendars for scheduling said flows, said scheduling method comprising the steps of:
    storing an active flow indicator for each calendar entry in a calendar status array (CSA);
    storing a subset of said active flow indicators from said calendar status array (CSA) in a cache utilizing a current pointer (CP) to a calendar entry and loading said subset of said active flow indicators from said calendar status array (CSA) starting at said current pointer (CP) CSA entry; and
    updating said calendar status array (CSA) based upon a predefined calendar range and resolution; and
    utilizing said subset of said active flow indicators stored in said cache to determine a flow of a calendar for servicing.

2. A scheduling method for implementing Quality-of-Service (QoS) scheduling for a plurality of flows with a cached status array as recited in claim 1 wherein the step of storing said active flow indicator for each calendar entry in said calendar status array (CSA) includes the step of storing one bit for each calendar entry in said calendar status array (CSA).

3. A scheduling method for implementing Quality-of-Service (QoS) scheduling for a plurality of flows with a cached status array as recited in claim 1 wherein the step of storing said active flow indicator for each calendar entry in said calendar status array (CSA) includes the step of storing said active flow indicator for each weighted fair queue (WFQ) ring entry in a calendar status array (CSA).

4. A scheduling method for implementing Quality-of-Service (QoS) scheduling for a plurality of flows with a cached status array as recited in claim 1 wherein said cache includes a predefined number of bits for storing said cache copy subset for each of the calendars and wherein the step of storing said subset of said active flow indicators from said calendar status array (CSA) in a cache utilizing a current pointer (CP) to a calendar entry and loading said subset of said active flow indicators from said calendar status array (CSA) starting at said current pointer (CP) CSA entry and includes the step of increasing through said predefined number of CSA entries equal to said predefined number of bits.

5. A scheduling method for implementing Quality-of-Service (QoS) scheduling for a plurality of flows with a cached status array as recited in claim 4 wherein the step of loading said subset of said active flow indicators from said calendar status array (CSA) includes the step of using said current pointer (CP) to determine one of plurality of addressed portions of said calendar status array (CSA) to be accessed.

6. A scheduling method for implementing Quality-of-Service (QoS) scheduling for a plurality of flows with a cached status array as recited in claim 5 wherein said predefined number of bits for storing said subset for each of the calendars is thirty-two bits and wherein said calendar status array (CSA) includes four addressed portions of one hundred twenty-eight bits of said calendar status array (CSA), each said addressed portion accessible in one cycle.

7. A scheduling method for implementing Quality-of-Service (QoS) scheduling for a plurality of flows with a cached status array as recited in claim 1 wherein the step of storing said active flow indicator for each calendar entry in said calendar status array (CSA) includes the step for each of said plurality of calendars of storing said active flow indicator for each calendar entry in said calendar status array (CSA).

8. A scheduling method for implementing Quality-of-Service (QoS) scheduling for a plurality of flows with a cached status array as recited in claim 7 wherein said plurality of calendars include a low latency service (LLS) calendar, a normal latency service (NLS) calendar, and a peak bandwidth service (PBS) calendar and includes the step segmenting each of said plurality of calendars into epochs (0:p), where epoch 0 has a highest resolution and a lowest range; and epoch 1 through epoch p have a range of n(p) times a range of epoch 0; and epoch 1 through epoch p have a resolution of $1/np$ times a resolution of epoch 0**, where n is a scaling factor.

9. A scheduling method for implementing Quality-of-Service (QoS) scheduling for a plurality of flows with a cached status array as recited in claim 8 wherein the step of updating said calendar status array (CSA) based upon a predefined calendar range and resolution includes the step of updating said calendar status array (CSA) based upon said predefined calendar range and resolution of said epoch 0 through said epoch p.

10. A scheduling method for implementing Quality-of-Service (QoS) scheduling for a plurality of flows with a cached status array as recited in claim 8 wherein the step of updating said calendar status array (CSA) based upon said predefined calendar range and resolution of said epoch 0 through said epoch p for said low latency service (LLS) calendar, said normal latency service (NLS) calendar, and said peak bandwidth service (PBS) calendar.

11. A scheduling method for implementing Quality-of-Service (QoS) scheduling for a plurality of flows with a cached status array as recited in claim 1 includes the step of utilizing said subset of said active flow indicators for incrementing said current pointer (CP) by an identified number of positions up to a current time (CT) value, said identified number of positions equal to a variable number of inactive flow indicators up to said current time (CT) value and said identified number of positions having a maximum value equal to a number of entries in said cache.

12. A QoS scheduler for implementing Quality-of-Service (QoS) scheduling for a plurality of flows comprising:
    a queue manager;
    a plurality of calendars coupled to said queue manager for scheduling said flows,
    a calendar status array (CSA) coupled to said plurality of calendars for storing an active flow indicator for each calendar entry for each of said plurality of calendars;
    a cache coupled to calendar status array (CSA) for storing a cache copy subset of said active flow indicators from said calendar status array (CSA) utilizing a current pointer (CP) to a calendar entry and for loading said subset of said active flow indicators from said calendar status array (CSA) starting at said current pointer (CP) CSA entry; and a calendar updating algorithm for updating said calendar status array (CSA) based upon a predefined calendar range and resolution; and said queue manager for utilizing said cache copy subset of said active flow indicators to determine a flow of a calendar for servicing.

13. A QoS scheduler for implementing Quality-of-Service (QoS) scheduling for a plurality of flows as recited in claim 12 wherein plurality of calendars include a low latency service (LLS) calendar, a normal latency service (NLS) calendar, and a peak bandwidth service (PBS) calendar.

14. A QoS scheduler for implementing Quality-of-Service (QoS) scheduling for a plurality of flows as recited in claim 12 wherein said calendar updating algorithm for updating calendar status array (CSA) based upon a predefined calendar range and resolution includes segmenting each of said plurality of calendars into epochs (0:p), where epoch 0 has a highest resolution and a lowest range; and epoch 1 through epoch p have a range of n(p) times a range of epoch 0; and epoch 1 through epoch p have a resolution of $1/n^{**}p$ times a resolution of epoch 0, where n is a scaling factor.

15. A QoS scheduler for implementing Quality-of-Service (QoS) scheduling for a plurality of flows as recited in claim 14 wherein said calendar updating algorithm for updating calendar status array (CSA) based upon a predefined calendar range and resolution is based upon a priority of said low latency service (LLS) calendar, said normal latency service (NLS) calendar, and said peak bandwidth service (PBS) calendar and a number of said epoch.

16. A QoS scheduler for implementing Quality-of-Service (QoS) scheduling for a plurality of flows as recited in claim 14 wherein said calendar updating algorithm for updating calendar status array (CSA) based upon a predefined calendar range and resolution accesses said calendar status array (CSA) by an ascending order said epoch for each of said calendars in an order of said low latency service (LLS) calendar, said normal latency service (NLS) calendar, and said peak bandwidth service (PBS) calendar.

17. A QoS scheduler for implementing Quality-of-Service (QoS) scheduling for a plurality of flows as recited in claim 14 includes said current pointer (CP) to determine one of a plurality of addressed portions of said calendar status array (CSA) to be accessed in a system cycle.

18. A QoS scheduler for implementing Quality-of-Service (QoS) scheduling for a plurality of flows as recited in claim 14 includes current pointer (CP) incrementing means utilizing said cache copy subset of said active flow indicators for incrementing said current pointer (CP) by an identified number of positions up to a current time (CT) value, said identified number of positions equal to a variable number of inactive flow indicators up to said current time (CT) value and said identified number of positions having a maximum value equal to a number of entries in said cache.

19. A computer program product for implementing Quality-of-Service (QoS) scheduling of a plurality of flows with a cached status array and a plurality of calendars for scheduling said flows in a scheduler, said computer program product including a plurality of computer executable instructions stored on a computer readable medium, wherein said instructions, when executed by said scheduler, cause said scheduler to perform the steps of:

storing an active flow indicator for each calendar entry for each of said plurality of calendars in a calendar status array (CSA);

storing a subset of said active flow indicators from said calendar status array (CSA) for each of said plurality of calendars in a cache utilizing a current pointer (CP) to a calendar entry and loading said subset of said active flow indicators from said calendar status array (CSA) starting at said current pointer (CP) CSA entry; and updating said calendar status array (CSA) based upon a predefined calendar range and resolution for each of said plurality of calendars; and utilizing said subset of said active flow indicators for each of said plurality of calendars to determine a flow of a calendar for servicing.

20. A computer program product for implementing Quality-of-Service (QoS) scheduling of a plurality of flows with a cached status array and a plurality of calendars for scheduling said flows in a scheduler as recited in claim 19 wherein said instructions, when executed by said scheduler, cause said scheduler to perform the steps of utilizing said subset of said active flow indicators for incrementing said current pointer (CP) by an identified number of positions up to a current time (CT) value, said identified number of positions equal to a variable number of inactive flow indicators up to said current time (CT) value and said identified number of positions having a maximum value equal to a number of entries in said cache.

* * * * *